(12) United States Patent
Christianson et al.

(10) Patent No.: US 8,701,333 B2
(45) Date of Patent: Apr. 22, 2014

(54) FISHING DEVICE

(76) Inventors: Levi John Christianson, Nisswa, MN (US); Michael John Christianson, Pequot Lakes, MN (US)

( * ) Notice: Subject to any disclaimer, the term of this patent is extended or adjusted under 35 U.S.C. 154(b) by 564 days.

(21) Appl. No.: 12/851,064

(22) Filed: Aug. 5, 2010

(65) Prior Publication Data

US 2011/0056112 A1    Mar. 10, 2011

Related U.S. Application Data

(60) Provisional application No. 61/231,866, filed on Aug. 6, 2009.

(51) Int. Cl.
*A01K 97/12*     (2006.01)

(52) U.S. Cl.
USPC .................................. 43/17; 43/16

(58) Field of Classification Search
USPC ................. 43/15–17, 18.1 R, 21.2
See application file for complete search history.

(56) References Cited

U.S. PATENT DOCUMENTS

| | | | | |
|---|---|---|---|---|
| 2,654,176 A * | 10/1953 | Kachelski et al. | ................. | 43/17 |
| 3,824,730 A * | 7/1974 | Johnson | ............................ | 43/17 |
| 4,021,958 A * | 5/1977 | Snodie | .............................. | 43/17 |
| 4,845,878 A * | 7/1989 | Hackel | ............................... | 43/17 |
| 4,980,986 A * | 1/1991 | Harper | ............................... | 43/17 |
| 5,044,108 A * | 9/1991 | Rinehart | ............................ | 43/17 |
| 5,050,333 A * | 9/1991 | Debreczeni | ........................ | 43/17 |
| 5,074,072 A * | 12/1991 | Serocki et al. | .................... | 43/17 |
| 5,551,183 A * | 9/1996 | Solem | ............................... | 43/17 |
| 5,890,312 A * | 4/1999 | Ball | ..................................... | 43/16 |
| 5,911,569 A * | 6/1999 | Isakson | ............................. | 43/17 |
| 6,088,945 A * | 7/2000 | Sanderfoot | .......................... | 43/4 |
| 6,857,218 B1 * | 2/2005 | Grahl et al. | ........................ | 43/17 |
| 6,966,140 B1 * | 11/2005 | Rozkowski | ....................... | 43/17 |
| 7,322,148 B2 * | 1/2008 | Coulman | .......................... | 43/17 |
| 7,716,867 B2 * | 5/2010 | Dungan | ............................ | 43/15 |
| 7,818,913 B1 | 10/2010 | Hoglund | | |

* cited by examiner

*Primary Examiner* — David Parsley
*Assistant Examiner* — Danielle Clerkley
(74) *Attorney, Agent, or Firm* — Erik G. Swenson; Fulbright & Jaworski L.L.P.

(57) ABSTRACT

A fishing device, for use with a reel and rod combination having fishing line with attached terminal tackle, includes a base, an indicator device, a trigger mechanism, and a line device. The base has a hole and slot configuration to allow a fishing line to feed through the base. The indicator device is coupled to the base and is configured to indicate the presence of a fish. The trigger mechanism is configured to cause the indicator device to pop up when the trigger device is activated. The line device attaches to the fishing line and is configured to activate the trigger mechanism. When a fish pulls on the terminal tackle, the line device activates the trigger mechanism that causes the indicator device to pop-up indicating to a user the presence of a fish.

10 Claims, 25 Drawing Sheets

2400

FISHING DEVICE

CROSS REFERENCE TO RELATED APPLICATION

This application claims the benefit of U.S. Provisional Patent Application No. 61/231,866, entitled "Fishing Device" to Christianson et al., filed Aug. 6, 2009.

TECHNICAL FIELD

The present invention relates to a fishing device. More specifically, the present invention relates to an ice fishing device for use with an ice fishing rod.

BACKGROUND OF THE INVENTION

A fishing pole holder may be used to support fishing poles in a raised position during use. Thus, the need for the fisherman to handle the pole at all times may be eliminated. In ice fishing, conventional fishing pole holders include a spike for pounding into the ice to provide a pole support. Other conventional fishing pole holders may be attached to an item, such as a bucket, for pole support. Conventional fishing pole holders do not assist the fisher in keeping the hole in the ice from freezing or assist in keeping snow from drifting into the hole. Additionally, conventional fishing pole holders may freeze in cold conditions.

Fishing pole holders may also include an indicating device, which is triggered by movement of the fishing line to signal the presence of a fish. One conventional indication may be a tipping up of the fishing pole. A conventional tip-up device for a fishing pole may include a spool of line. The spool of line is fed through a tip-up indicating device such that when a fish pulls on the line the indicating device is triggered. When reeling in the line of a conventional tip-up device the line is pulled in hand-over-hand, which is a disadvantage to the fisher. Additionally, conventional tip-up devices place restrictions on the type of line that may be used.

BRIEF SUMMARY OF THE INVENTION

According to one embodiment, an apparatus includes a base having a hole to allow a fishing line to go through the base. The apparatus also includes an indicator device coupled to the base. The apparatus further includes a trigger mechanism configured to cause the indicator device to activate when the trigger mechanism is tripped. The apparatus also includes a line device coupled to the fishing line and configured to trip the trigger mechanism.

According to another embodiment, a method of using a fishing device having a base, trigger mechanism, an indicator device, and a line device includes setting the base over a hole. The method also includes feeding a fishing line through the line device. The method further includes attaching the line device to the trigger mechanism. The method also includes setting the trigger mechanism to hold down the indicator device.

According to a further embodiment, a line device includes a loop. The line device also includes a hook end connected to the loop, the hook end having a first and second slot.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific embodiments disclosed may be readily utilized as a basis for modifying or designing other structures for carrying out the same purposes of the present disclosure. It should also be realized by those skilled in the art that such equivalent constructions do not depart from the technology of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present invention, reference is now made to the following descriptions taken in conjunction with the accompanying drawings.

DETAILED DESCRIPTION OF THE INVENTION

The present disclosure relates to a fishing device for use with a fishing rod and reel combo having fishing line and terminal tackle. The fishing device may include a base, a trigger mechanism, a line device, and an indicator device. The indicator device may be, for example, a flag. During use, the fishing line may be fed through the line device. At an end of the fishing line, a jig, hook, or other terminal tackle may be used. The line device may be attached to the trigger mechanism. The line device may be configured to activate the trigger mechanism when a fish pulls on the fishing line, such as by biting on the terminal tackle. The trigger mechanism may cause an indicator device to activate to notify a fisher that a fish is on the line.

A base for the fishing device may fit over an ice fishing hole such that the base may be supported by ice around a circumference of the hole. According to one embodiment, the base may be constructed from a material, such as plastic, that reduces the likelihood of the base freezing to the ice. In another embodiment, the base may be constructed from a dark material to retain solar heat to reduce the likelihood of the base freezing in cold weather. In additional embodiments, the base may include a wind deflector and/or solar warming devices. The base may include a hole and/or slot for the fishing line to enter the water. The base may also include a rod holder for holding a rod or a rod and reel combo. The base may further include a storage port for the rod holder.

Figure 1:
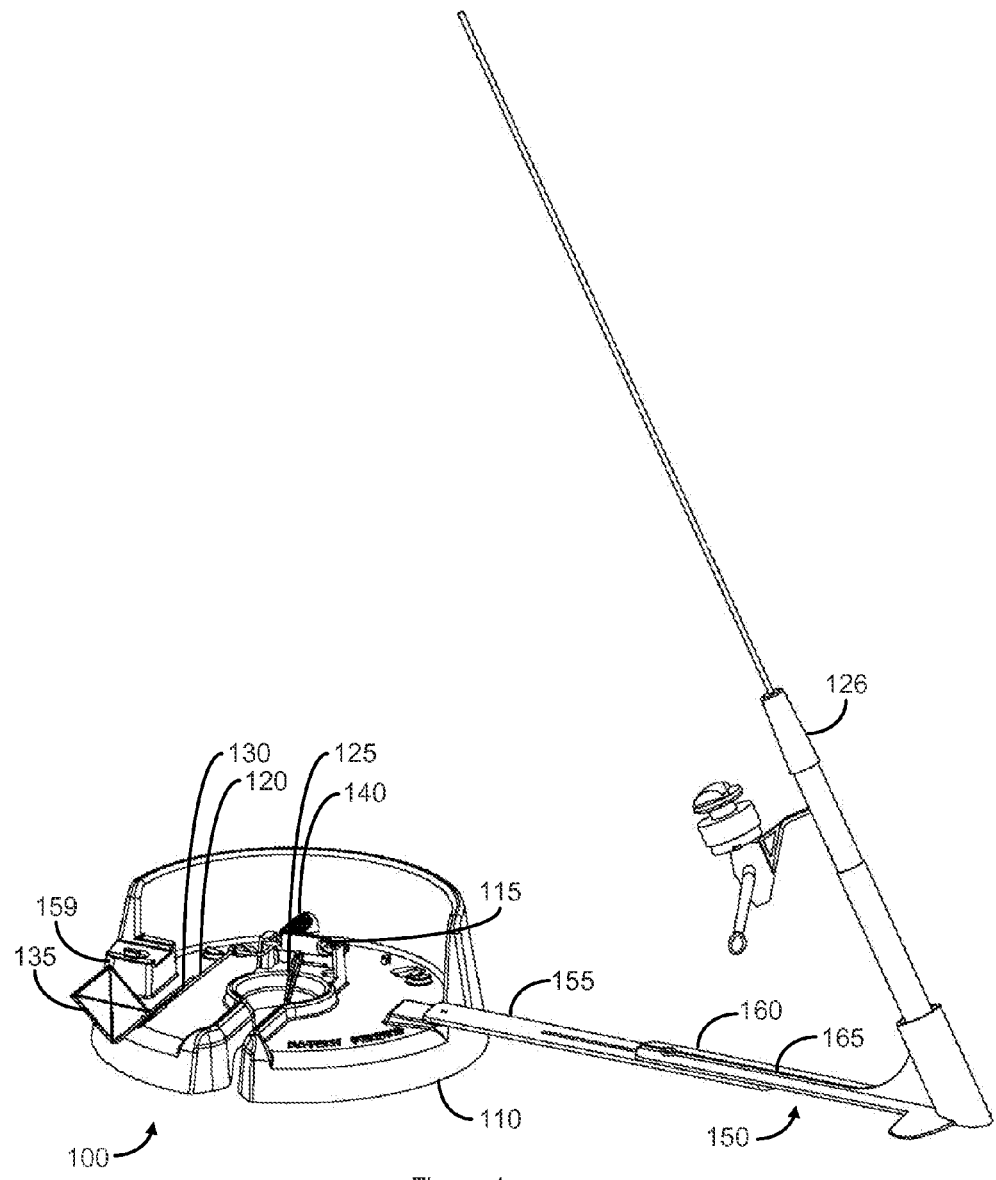
FIG. 1 is a front perspective view illustrating a fishing device according to one example embodiment.

Referring to FIG. 1, a fishing device 100 is illustrated by a perspective view according to one embodiment. The fishing device 100 may include a base 110, a trigger mechanism 115, an indicator device 120, and a line device 125. Fishing line (not shown) from a rod and reel combination 126 may be fed through the line device 125. The line device 125 may be coupled to the trigger mechanism 115. The trigger mechanism 115 may be in slideable engagement with the base 110 and hold down the indicator device 120. When a fish bites or pulls on the fishing line the line device 125 is pulled along with the fishing line. The line device 125 then pulls or activates the trigger mechanism 115 to laterally release the trigger mechanism 115 from the base 110. When the trigger mechanism 115 is released from the base 110 the trigger mechanism 115 releases the indicator device 120. According to one embodiment, the indicator device 120 pops up to indicate to a fisher a fish may be present on the fishing line.

Figure 2:
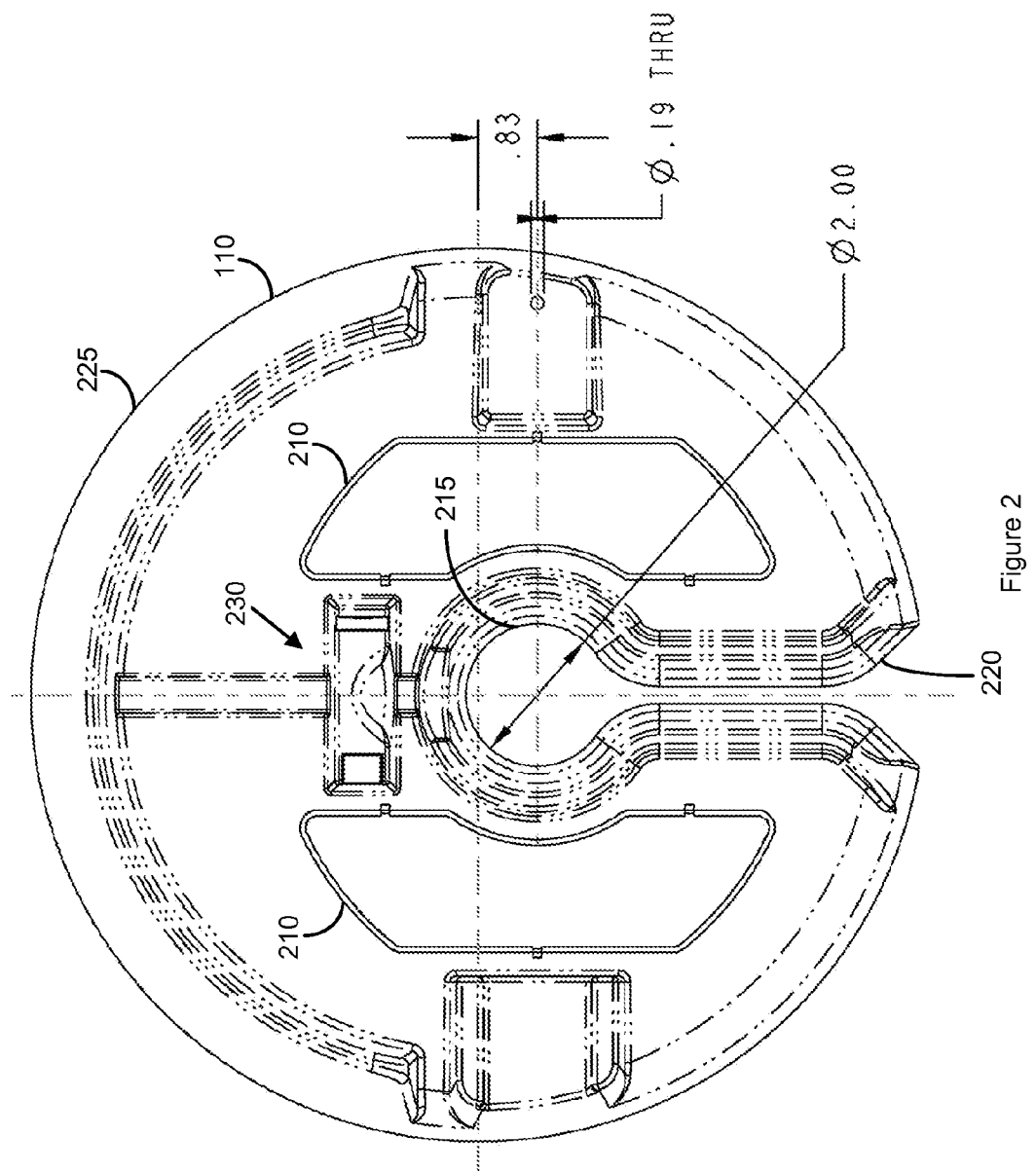
FIG. 2 is a top view illustrating a fishing device according to one example embodiment.

FIG. 2 is a top view illustrating a base of a fishing device according to one embodiment. According to one embodiment, the base 110 may be circular. The base 110 may be, however, any suitable shape. The base 110 may be constructed of an inexpensive, rigid material such as, for example, polypropylene. According to one embodiment, the material of the base 110 may be a dark color to retain solar heat. Retained solar heat reduces the likelihood of the base 110 freezing or sticking to ice. Additionally, the base 110 may be constructed with solar panels 210. The solar panels 210 focus additional sunlight below the base to reduce the likelihood of the base 110 freezing or sticking to the ice. The solar panels 210 may be, for example, a clear plastic material or another suitable material. The base 110 may be between 8 inches and 16 inches in outside diameter. According to one embodiment, the base 110 may be approximately 12.53 inches in outside diameter.

The base 110 may include a hole 215 and/or a slot 220. The hole 215 allows a fishing line and terminal tackle (not shown) to enter the water through the base 110. The hole 215 may be between 1 and 3 inches in diameter. According to one embodiment, the hole 215 is 2 inches in diameter. The slot 220 may facilitate larger terminal tackle by allowing the fishing line to be slid through the slot 220 while the terminal tackle remains below the base 110. According to one embodiment, the base 110 may include a wind deflector 225. The wind deflector 225 may reduce likelihood of the base 110 freezing and/or deflect blowing snow from gathering around or in the hole 215.

Figure 3:
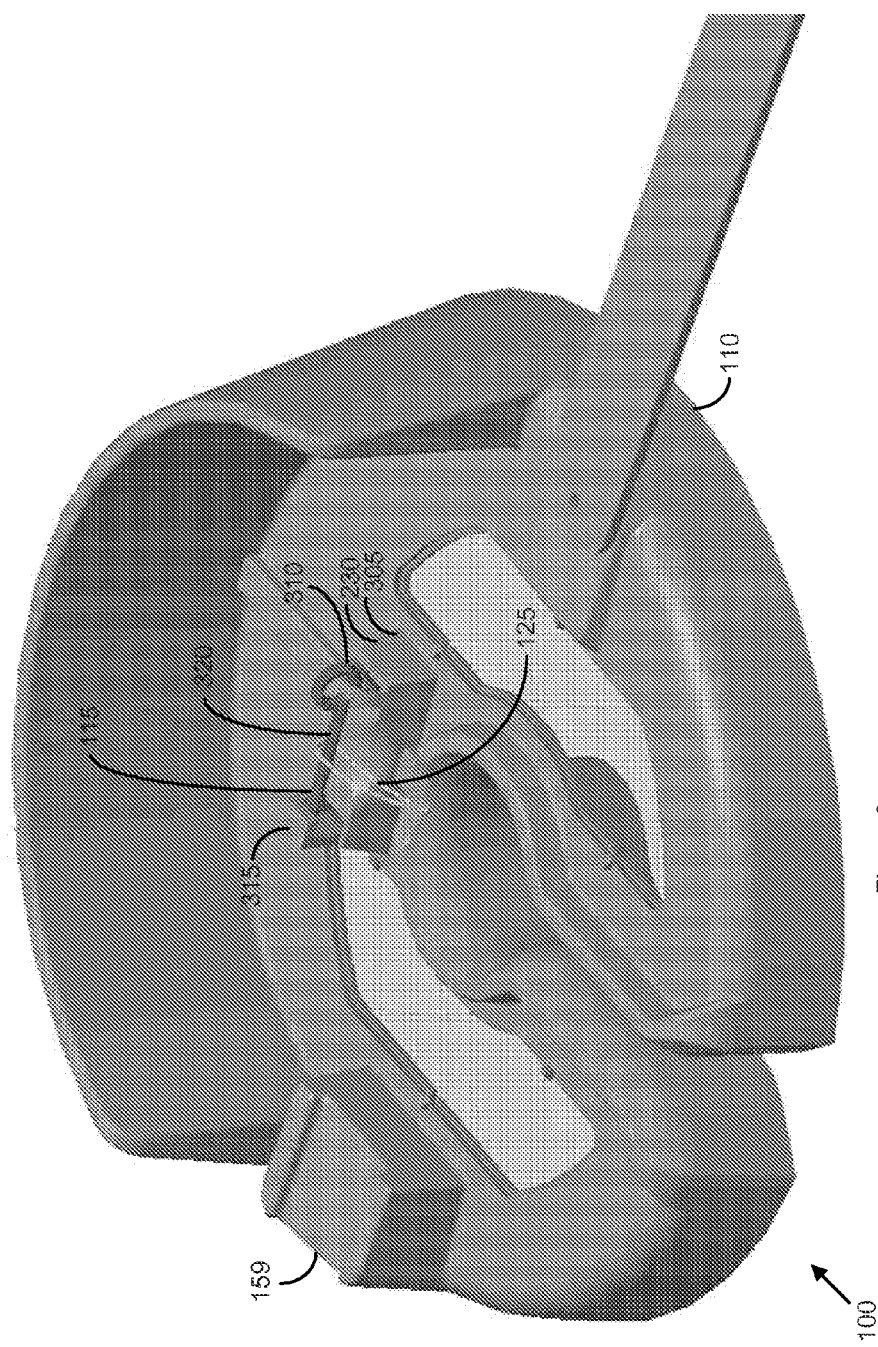
FIG. 3 is an enlarged perspective view illustrating a base of a fishing device according to one example embodiment.
Figure 4:
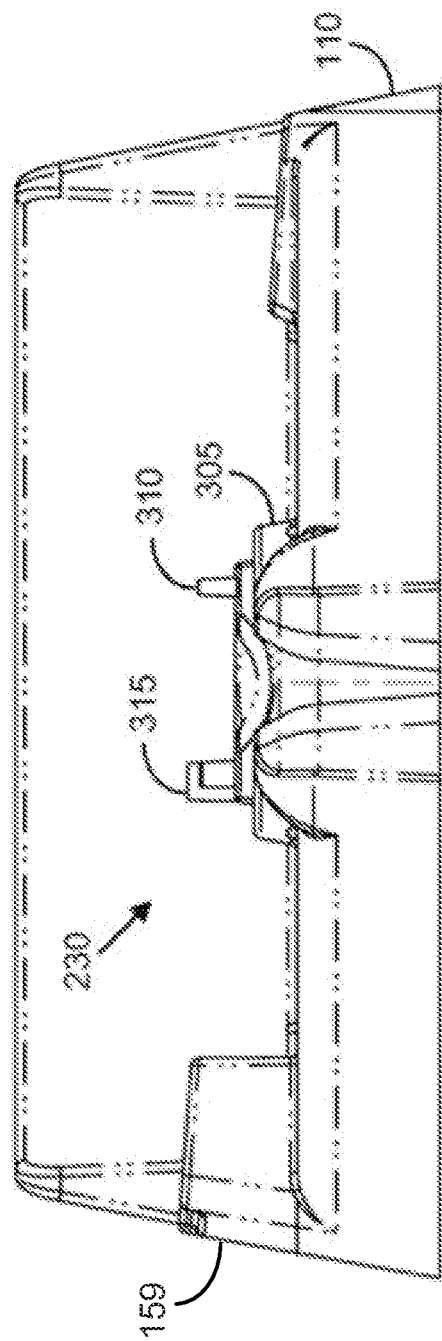
FIG. 4 is a front view illustrating a base of a fishing device according to one example embodiment.

The base 110 may include a trigger receiver 230 configured to receive the trigger mechanism 115. Reference will now be made to FIGS. 3 and 4. FIG. 3 is an enlarged perspective view illustrating the base 110, the trigger mechanism 115, and the line device 125 according to one embodiment. FIG. 4 is a front view illustrating the base 110 according to one embodiment. The trigger receiver 230 may include a receiver base 305, a receiver loop 310, and a receiver hook 315.

Figure 5:
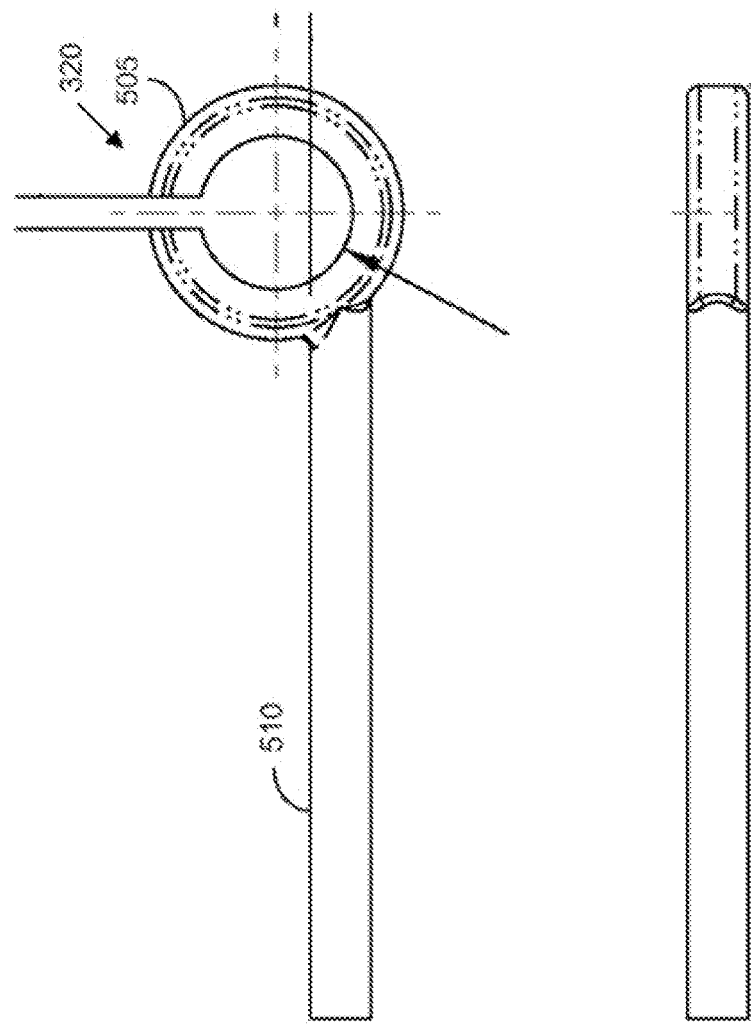
FIG. 5 is a plan view illustrating a trigger according to one example embodiment.
Figure 6:
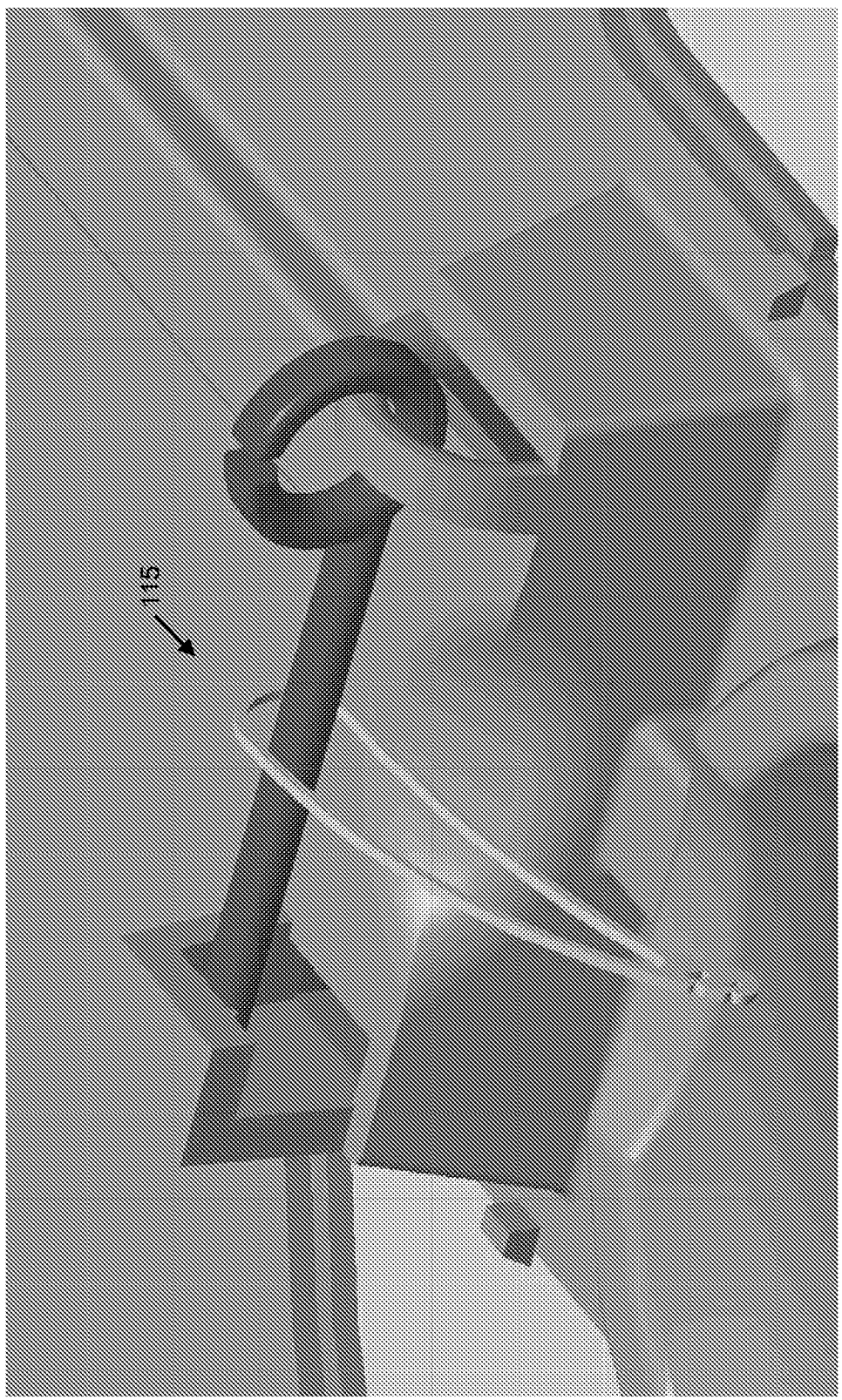
FIG. 6 is a perspective view illustrating a trigger mechanism according to one example embodiment.

The trigger mechanism 115 may include a trigger 320. Referring to FIG. 5, a front view is shown illustrating a trigger according to one embodiment. The trigger 320 includes a trigger loop 505 and a straight portion 510. The trigger loop 505 may be configured to engage with the receiver loop 310 to retain the trigger 320 to the base 110. The straight portion 510 may slide under the receiver hook 315 to retain the straight portion 510 under the receiver hook 315. The trigger 320 may be between 1 inch and 5 inches long. According to one embodiment, the trigger 320 is approximately 2.32 inches. FIG. 6 is a perspective view illustrating the trigger mechanism 115 according to one embodiment.

Referring back to FIGS. 1 and 5, the line device 125 may be slid onto the straight portion 510 of the trigger 320 prior to sliding the straight portion 510 under the receiver hook 315. When a fish pulls on the fishing line, the line device 125 may be pulled, and the line device 128 may pull the straight portion 510 of the trigger 320 out from under the receiver hook 315. According to one embodiment, the indicator device 120 may be held down by the trigger 320. Thus, when the straight portion 510 of the trigger 320 is pulled out from under the receiver hook 315 the indicator device 120 pops up to indicate a fish is on the line.

The indicator device 120 may include a pole 130, a flag 135, and a spring 140. The flag 135 may be attached to one end of the pole 130. The pole 130 passes through or attaches to the spring 140 at the other end of the pole 130. The spring 140 and the pole 130 may be attached to the base 110, while the flag end of the pole 130 may be unattached. Thus, when the straight portion 510 of the trigger 320 is pulled out from under the receiver hook 315 the spring causes the pole 130 to stand straight up along with the flag 115.

Figure 7:
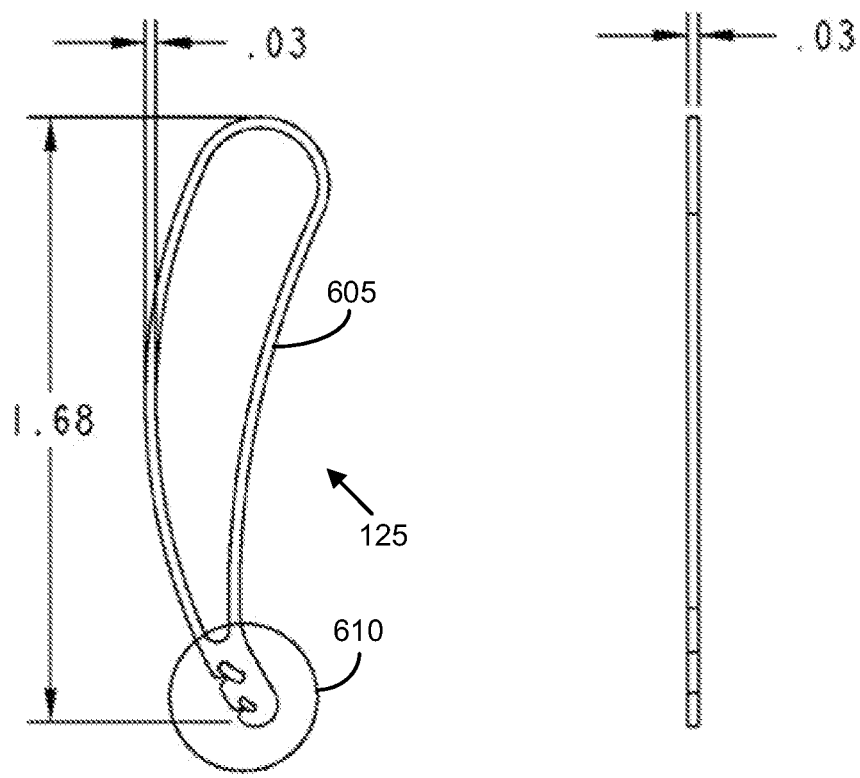
FIG. 7 is a plan view illustrating a line device according to one example embodiment.
Figure 8:
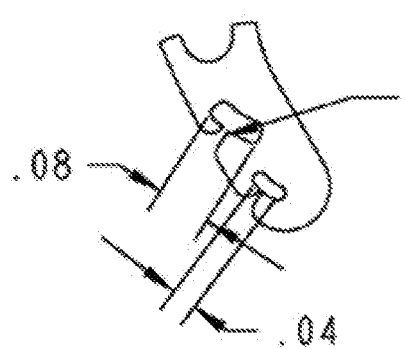
FIG. 8 is a plan view illustrating a hook portion of a line device according to one example embodiment.

Referring now to FIG. 7, a plan view is shown illustrating a line device according to one embodiment. The line device 125 includes a line loop 605 and a hook portion 610. The line loop 605 may be hooked around the straight portion 510 of the trigger 320 shown in FIG. 5. Referring to FIG. 8, a plan view is shown illustrating a hook portion of a line device according to one embodiment. The hook portion 610 of the line device 125 may include a first slot 705 and second slot 710. The fishing line may be fed through the first slot 705 or the second slot 710 to retain the fishing line within the line device 125. The second slot 710 may be approximately twice the size of the first slot 705 to accommodate larger fishing lines. For example, the first slot 705 may be between 0.02 inches and 0.06 inches, and the second slot 710 may be between 0.04 inches and 0.12 inches. The line device 125 may be between 1 inch and 3 inches long. According to one embodiment, the line device 125 may be approximately 1.68 inches in length.

Referring back to FIG. 1, the fishing device 100 may include a rod holding device 150 attached to the base 110. The rod holding device 150 may be constructed from a suitable material such as, for example, polypropylene. The rod holding device 150 may include a first arm portion 155 and a second arm potion 160. The first and second arm portions 155, 160 may have a pivotal relationship to one another. Additionally, the first arm potion 155 may be coupled to the base 110 in a pivotal relationship. According to one embodiment, the second arm portion 160 may include a longitudinal slot 165. The longitudinal slot 165 allows the length of the rod holding device 150 to be adjusted to fit different rod setups and/or designs.

Figure 9:
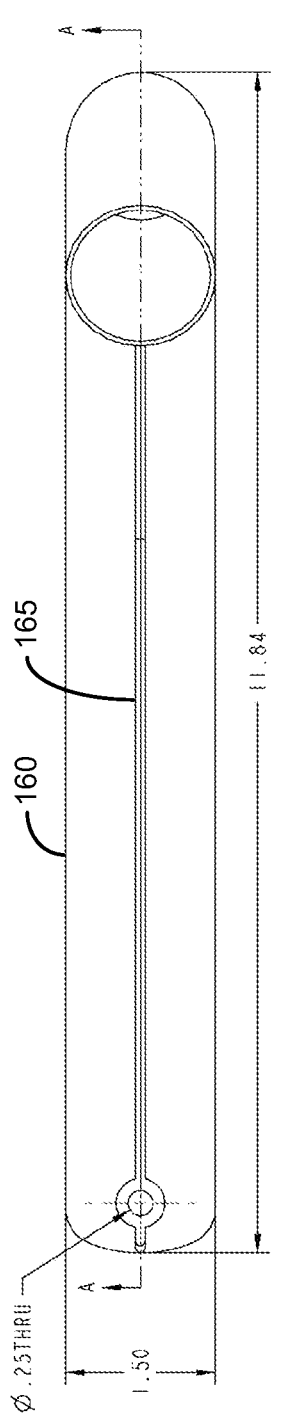
FIG. 9 is a plan view illustrating a second arm portion of a rod holding device according to one example embodiment.
Figure 10:
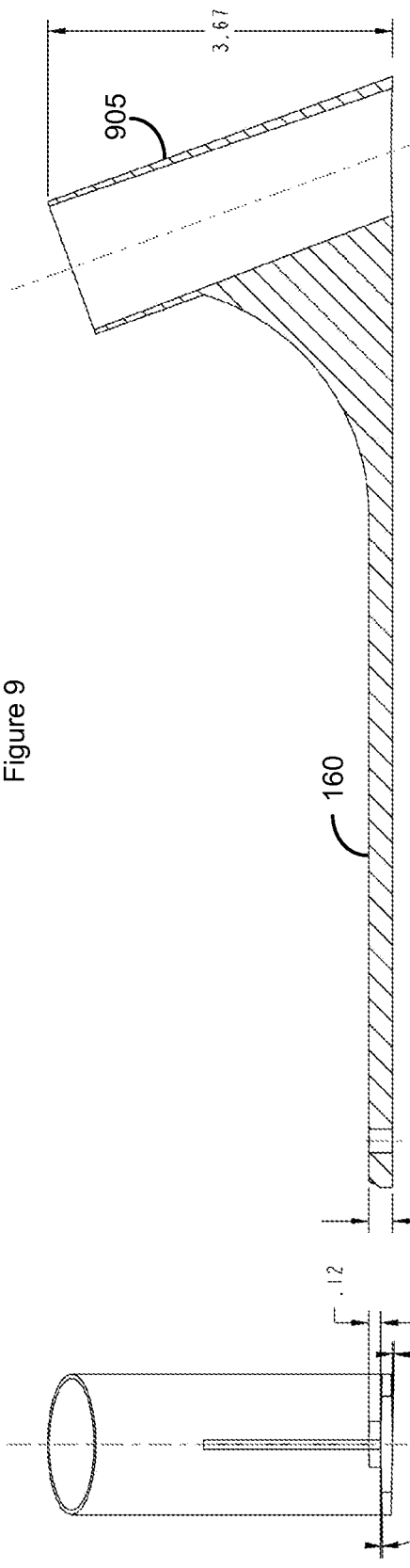
FIG. 10 is a side view illustrating a second arm potion of a rod holding device according to one example embodiment.

Referring now to FIGS. 9 and 10, a second arm portion of a fishing device is shown according to one embodiment. The second arm portion 160 may be between 6 inches and 18 inches in length. According to one embodiment, the second arm portion 160 may be approximately 11.84 inches in length. The second arm portion 160 may include a rod holder 905 for holding a rod and reel combination such as the rod and reel combination 126 of FIG. 1.

Figure 11:
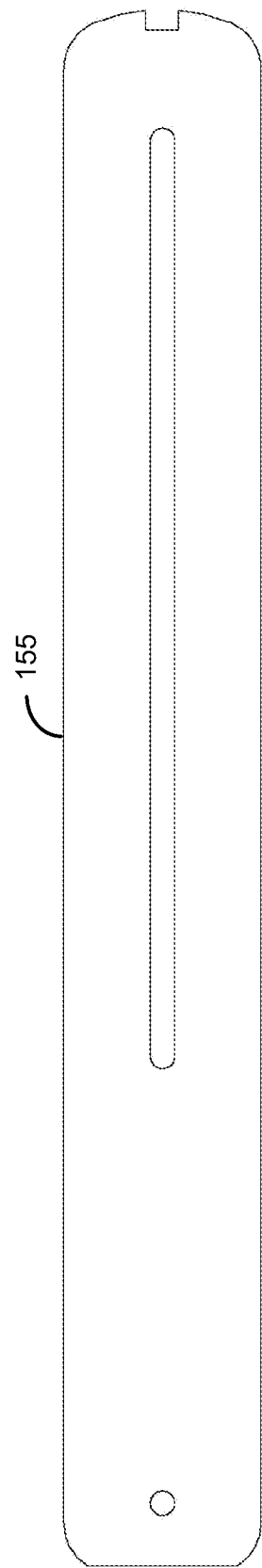
FIG. 11 is a plan view illustrating a first arm portion of a rod holding device according to one example embodiment.

Referring now to FIG. 11, a first arm portion of a fishing device is shown according to one embodiment. The first arm portion 155 may be between 6 inches and 18 inches in length. According to one embodiment, the first arm portion 155 may be approximately 11.88 inches in length.

Figure 12:
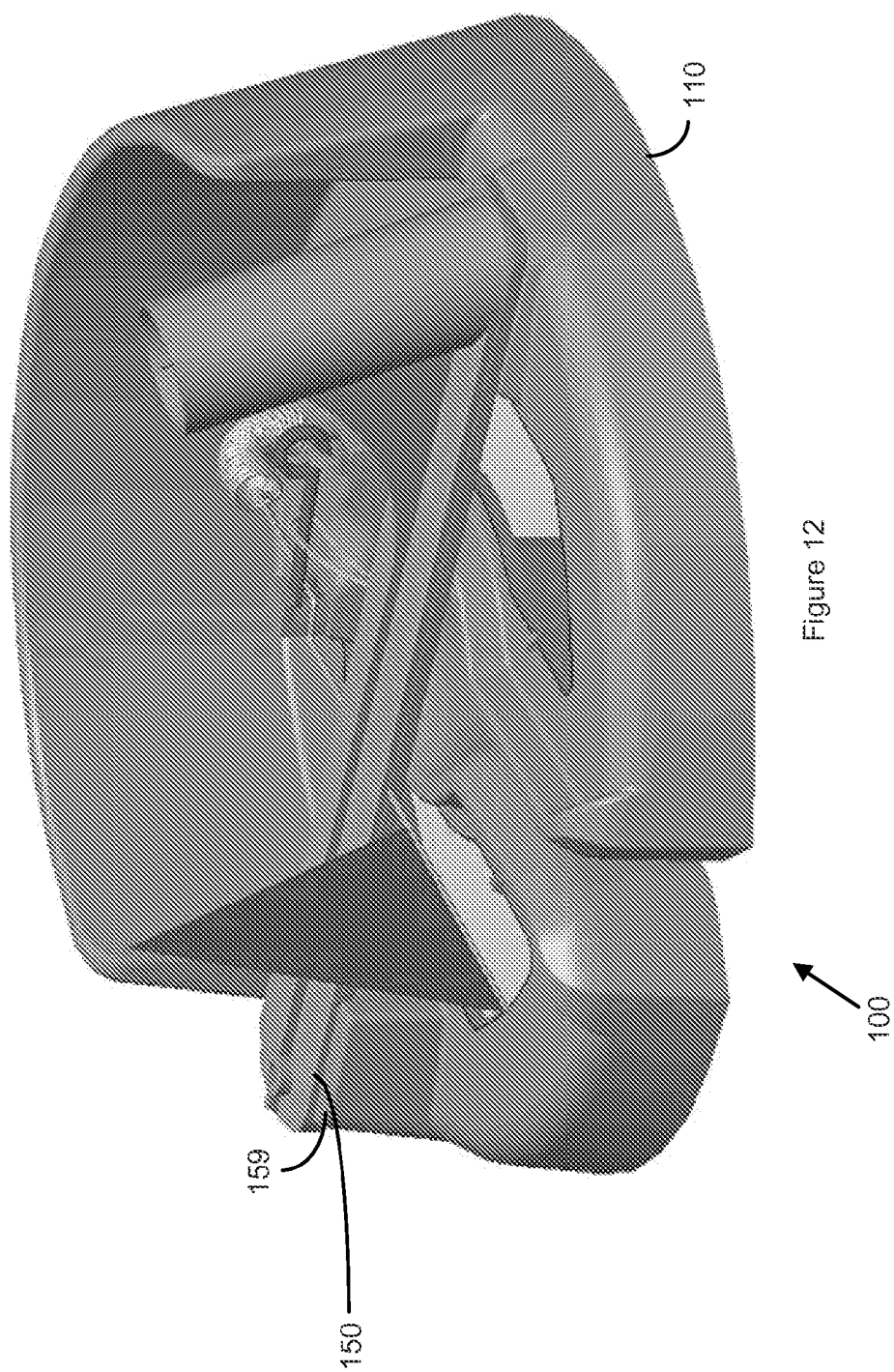
FIG. 12 is a perspective view illustrating a fishing device in a stored configuration according to one example embodiment.
Figure 13:
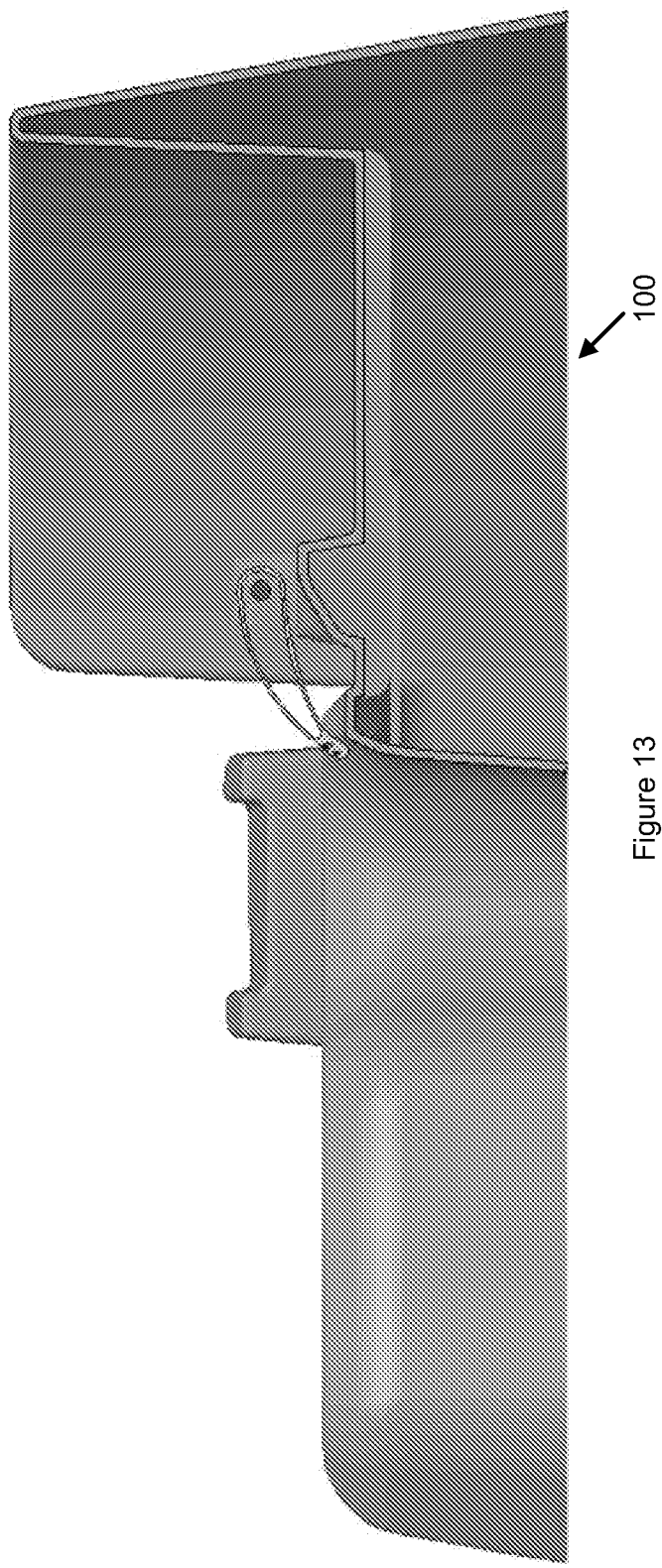
FIG. 13 is a side view illustrating the fishing device according to one example embodiment.

Referring now to FIG. 12, a perspective view is shown illustrating a fishing device in a stored configuration according to one embodiment. The rod holding device 150 may be folded and stored within the base 110. In particular, the base 110 may include a holder retaining device 159 where a center pivot joint between the first and second arms 155, 160 may be retained. FIG. 13 is a side view illustrating the fishing device 100 according to one embodiment.

Through way of example, a use of a fishing device is described with reference to FIGS. 1-13. A fisherman may place a terminal tackle on an end of a fishing line coupled to the rod and reel combination 126. The fisherman hooks one of the first slot 705 or the second slot 710 of the hook portion 610 of the line device 125 onto the fishing line. The fisherman slides the fishing line through the slot 220 and into the hole 215, with the terminal tackle below the base 110. The fisherman feeds the line loop 605 around the straight portion 510 of the trigger 320. The fisherman presses the indicator device 120 down and slides the straight portion 510 of the trigger 320 over the indicator device 120 and under the receiver hook 315. Thus, the indicator device 120 is held down by the trigger 320. When a fish bites the terminal tackle, the line device 125 is pulled by the fishing line. The line device 125 pulls the straight portion 510 of the trigger 320 out from under the receiver hook 315, releasing the indicator device 120. The spring 140 causes the indicator device 120 to pop-up and the flag 135 stands up, indicating to the fisherman that a fish is on the line.

Figure 14:
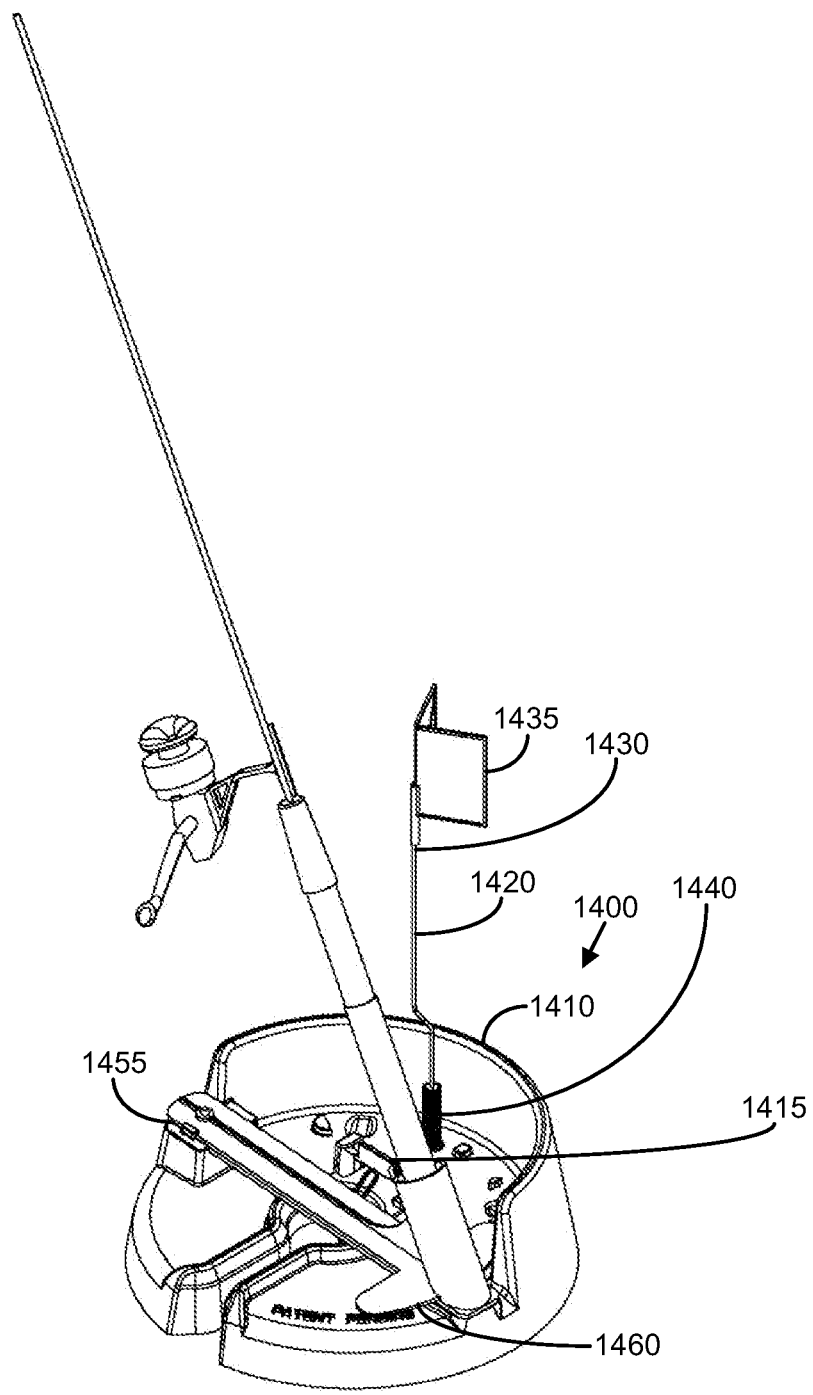
FIGS. 14-27 are drawings illustrating a fishing device according to other example embodiments.
Figure 15:
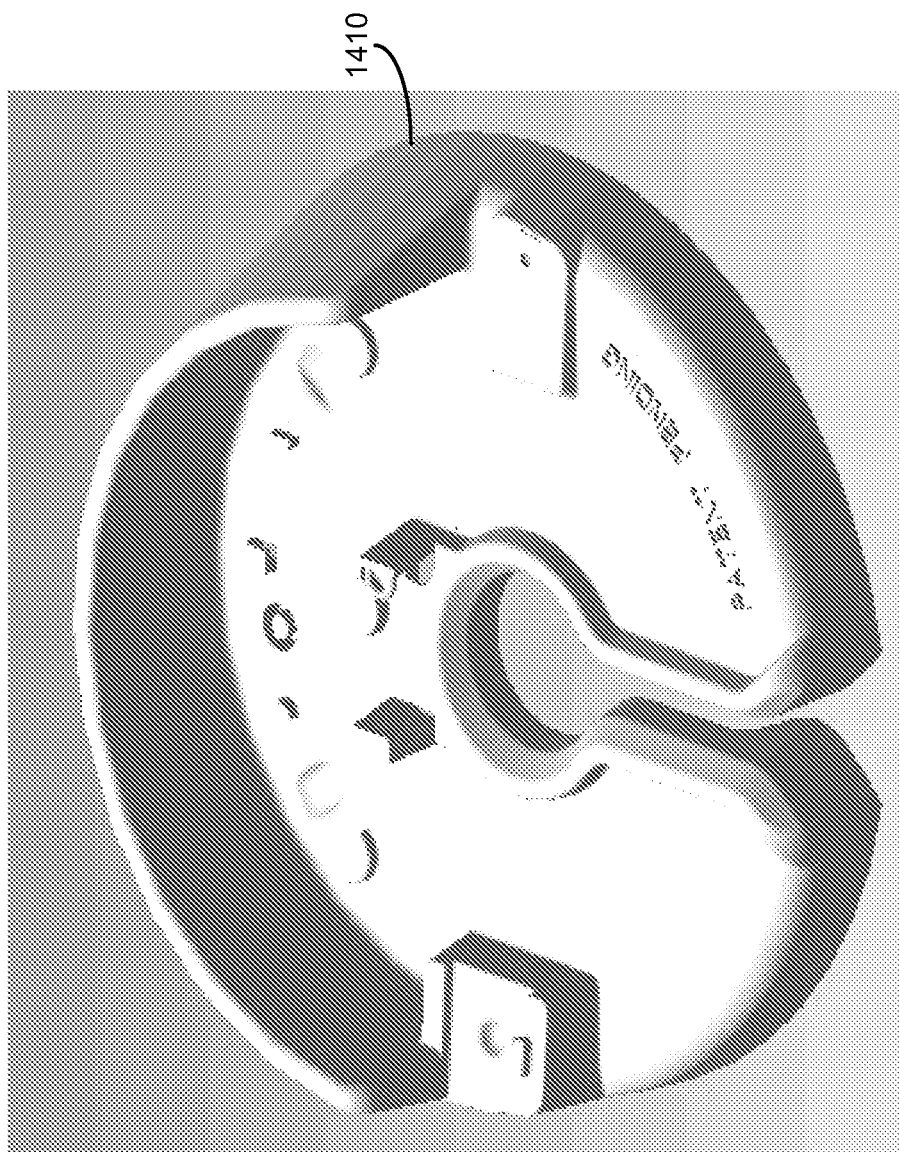
Figure 16:
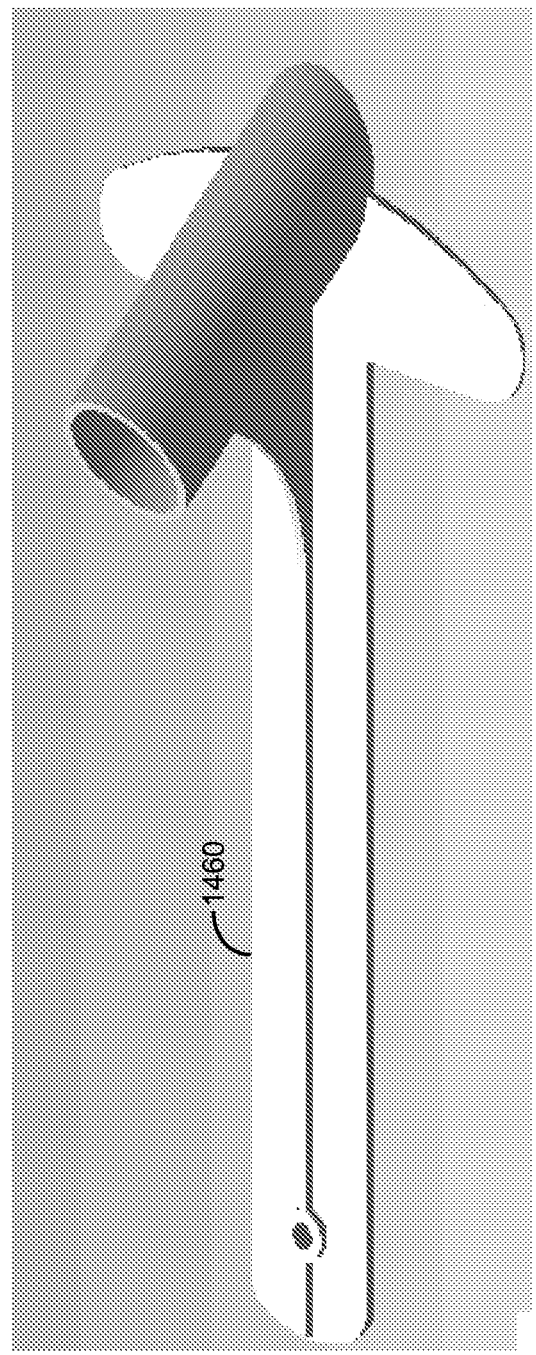
Figure 17:
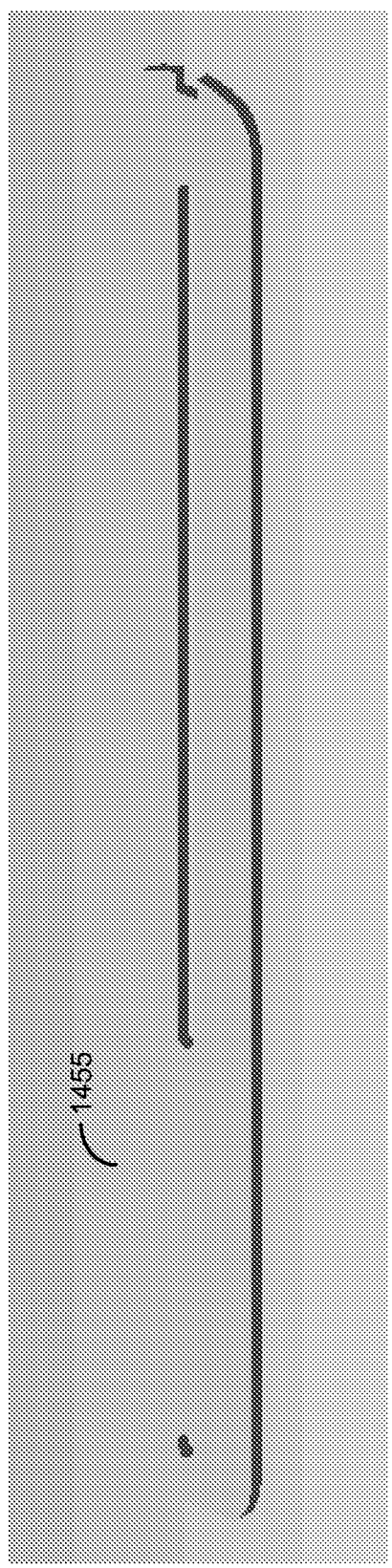
Figure 18:
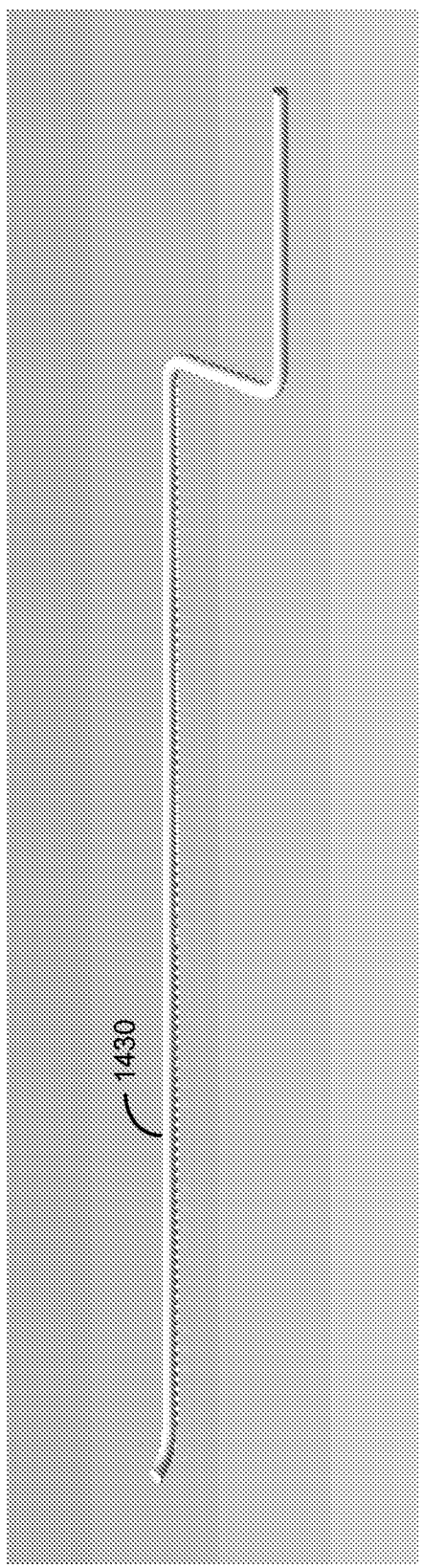
Figure 19:
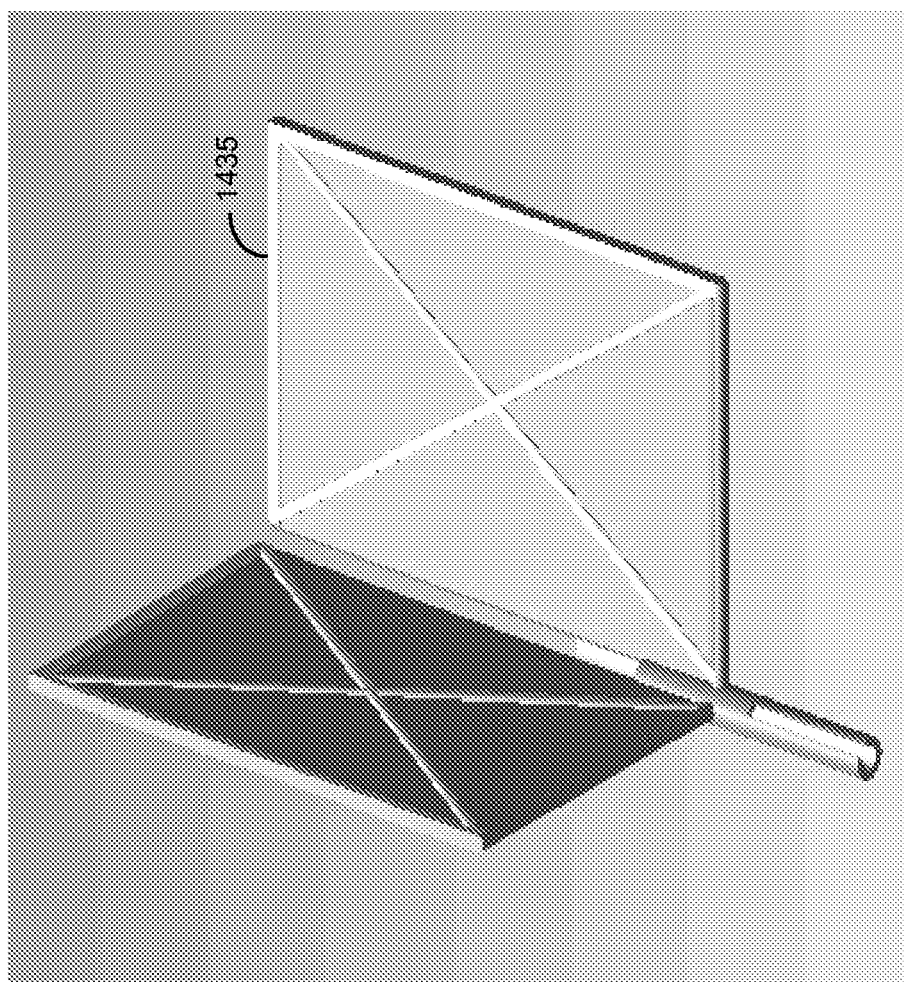
Figure 20:
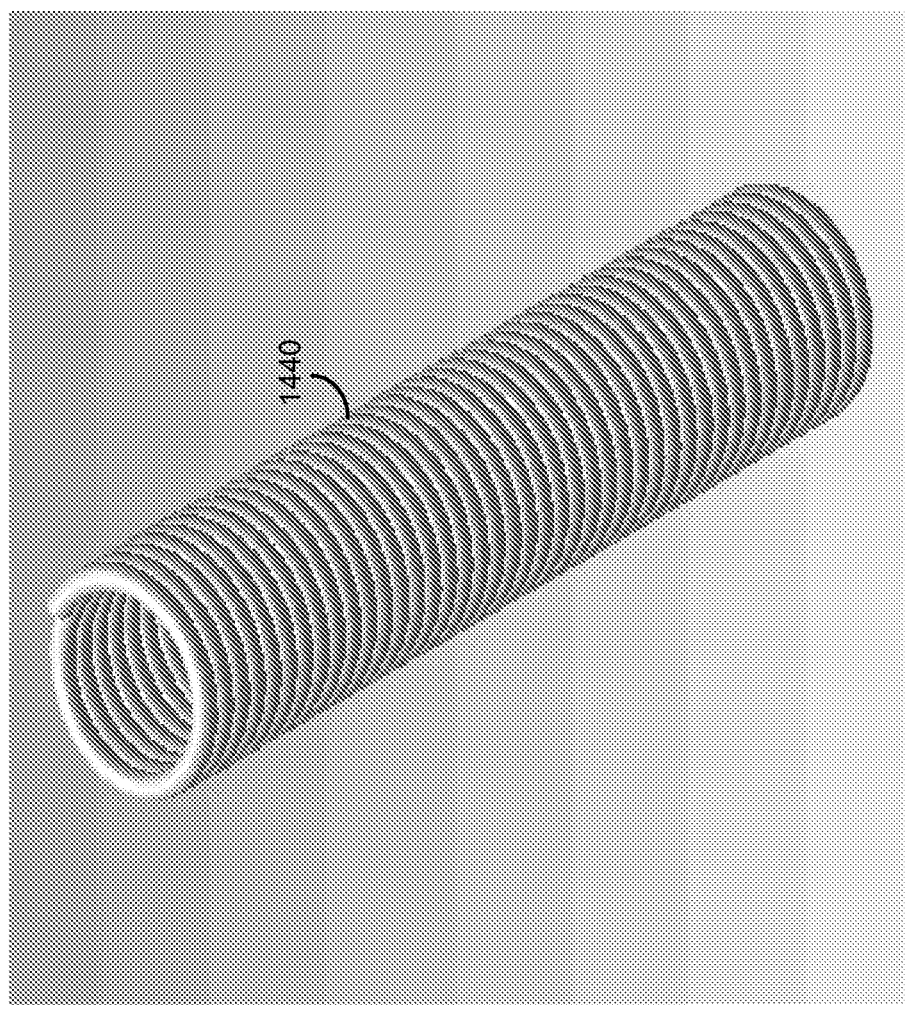
Figure 21:
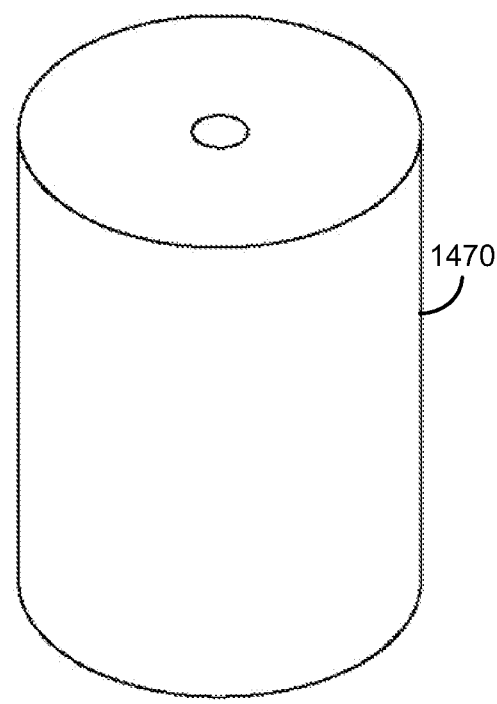
Figure 22:
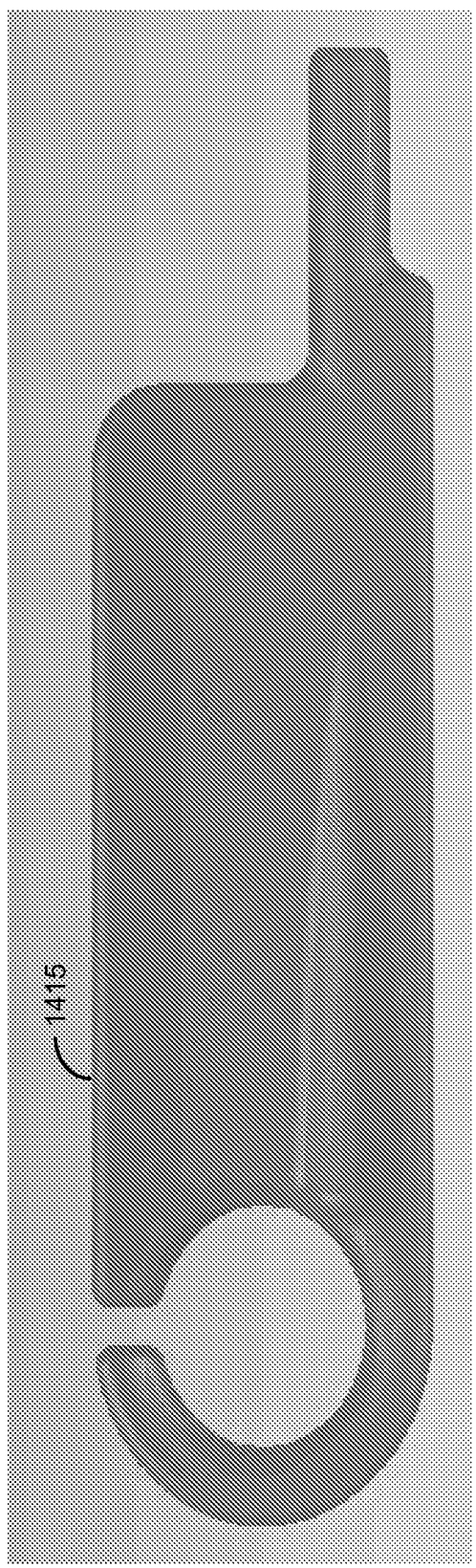
Figure 23:
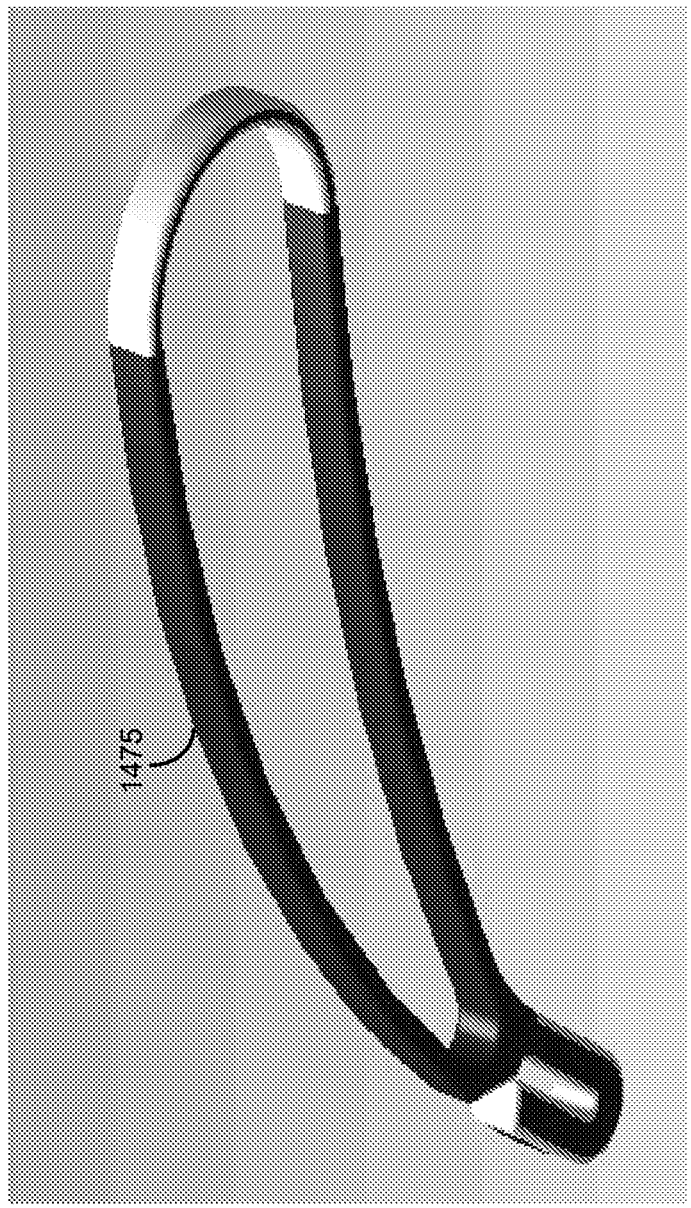
Figure 24:
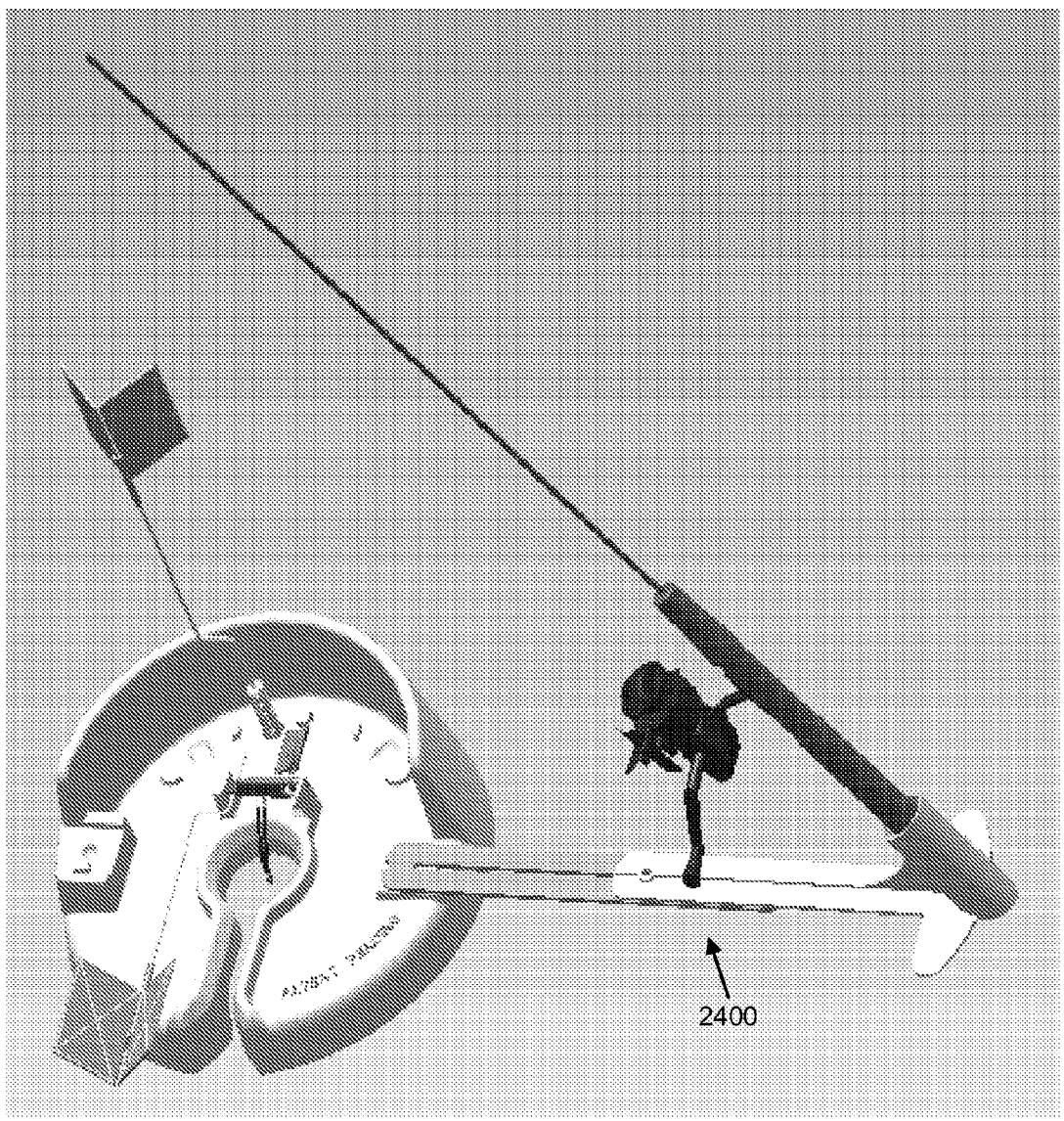
Figure 25:
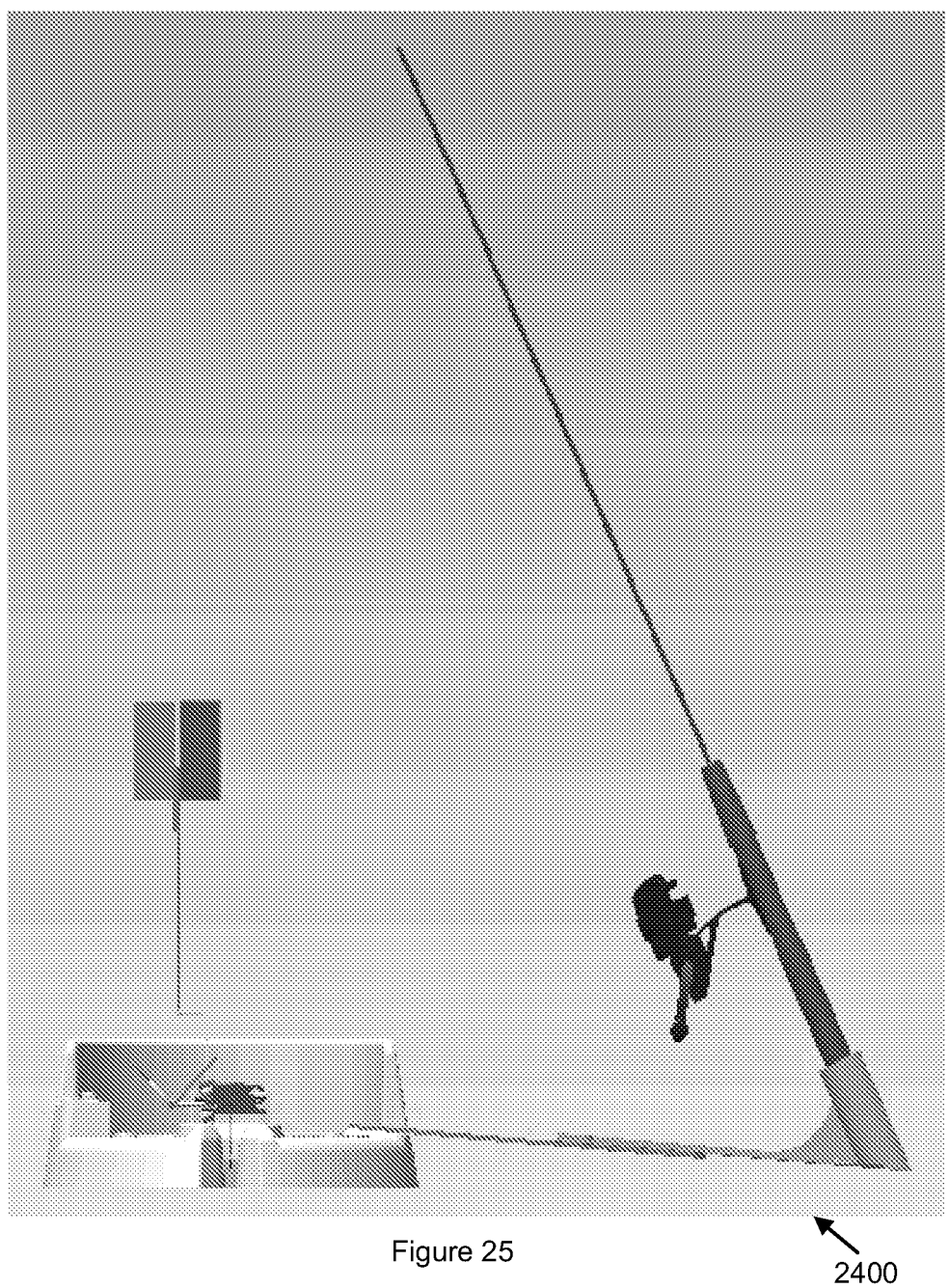
Figure 26:
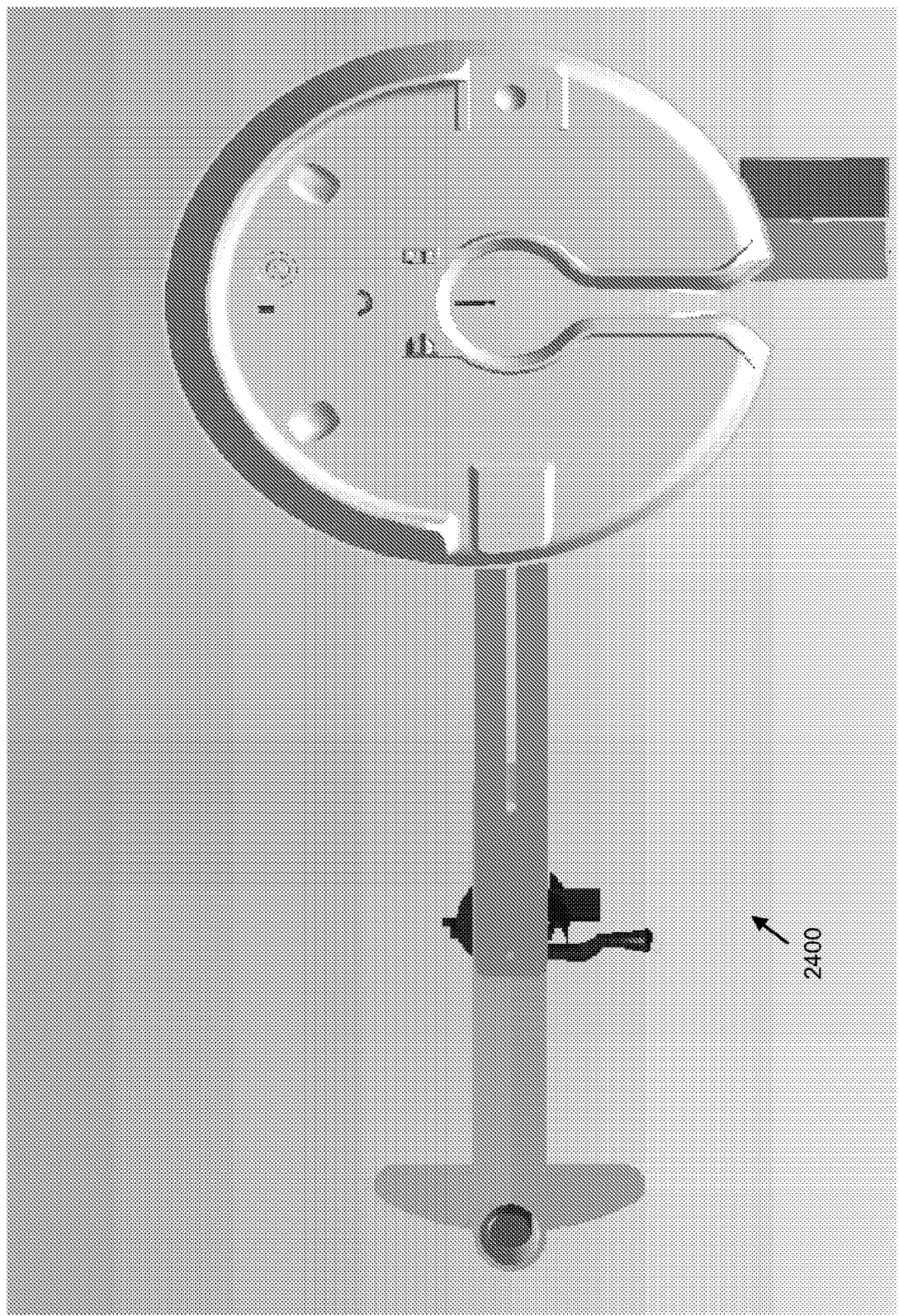
Figure 27:
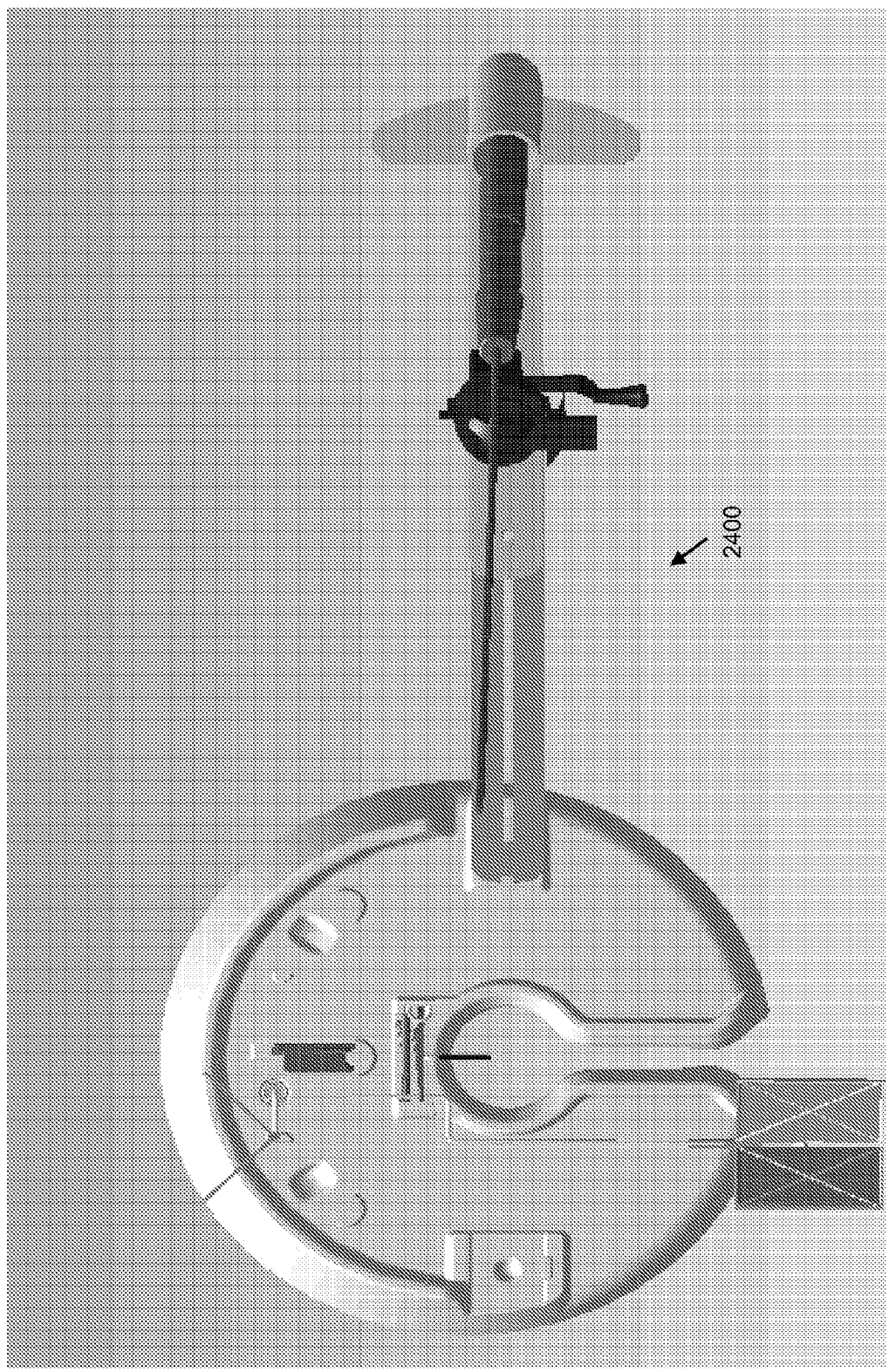

FIGS. 14-27 are drawings illustrating a fishing device according to other example embodiments. FIG. 14 is a perspective view illustrating a fishing device according to the second example embodiment. A fishing device 1400 includes a base 1410, an indicator device 1420, a pole 1430, a flag 1435, a spring 1440, a trigger mechanism 1415, a first arm 1455, and a second arm 1460. FIG. 15 is a perspective view illustrating the base 1410 of the fishing device 1400. It is noted that in this example embodiment, the base 1410 does not include any solar panels. FIG. 16 is a perspective view illustrating the second arm 1460 of the fishing device 1400. FIG. 17 is a perspective view illustrating the first arm 1455 of the fishing device 1400. FIG. 18 is a perspective view illustrating the pole 1430 of the fishing device 1400. FIG. 19 is a perspective view illustrating the flag 1435 of the fishing device 1400. FIG. 20 is a perspective view illustrating the spring 1440 of the fishing device 1400. FIG. 21 is a perspective view illustrating a plug 1470 for the fishing device 1400. FIG. 22 is a perspective view illustrating a trigger mechanism 1415 of the fishing device 1400. FIG. 23 is a perspective view illustrating a bobberstop 1475 for the fishing device 1400. FIG. 24 is a top perspective view illustrating a fishing device 2400 according to a third example embodiment. FIG. 25 is a side perspective view illustrating the fishing device 2400 according to a third example embodiment. FIG. 26 is a bottom perspective view illustrating the fishing device 2400 according to a third example embodiment. FIG. 27 is a top perspective view illustrating the fishing device 2400 according to a third example embodiment.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An apparatus intended for use with a fishing rod, wherein the fishing rod includes a fishing line, the apparatus comprising: a base comprising at least one rod holder coupled to the base for receiving a fishing rod, and at least one aperture located within the perimeter of the base, said at least one aperture structured and arranged to allow a fishing line to go through the base; an indicator device coupled to the base; a trigger mechanism coupled to the base and configured to cause the indicator device to activate when the trigger mechanism is tripped; a line device coupled to the fishing line and configured to trip the trigger mechanism; at least one channel extending from the perimeter of said base to said at least one aperture, said at least one channel structured and arranged to allow the apparatus to be separated from the fishing line; and a pivotal extension arm having a proximal end pivotally coupled to the base and a distal end coupled to the at least one rod holder, said pivotal extension arm is movable between a stored position in which the arm and the at least one rod holder rest across the base, and a deployed position in which the arm and the at least one rod holder extend beyond the perimeter of the base.

2. The apparatus of claim 1, wherein the indicator device pops up when activated by the trigger mechanism.

3. The apparatus of claim 1, wherein the indicator device is configured to indicate a presence of a fish and when a fish pulls on a terminal tackle coupled to the fishing line, the line device activates the trigger mechanism that causes the indicator device to pop-up indicating to a user the presence of the fish.

4. The apparatus of claim 1, wherein the base comprises a holding device for storing the rod holder.

5. The apparatus of claim 4:
wherein said rod holder can be stored within the perimeter of the said base; and
wherein said rod holder can be extended beyond the perimeter of said base.

6. The apparatus of claim 1, further comprising a wind deflector coupled to the base.

7. The apparatus of claim 1, further comprising a solar panel coupled to the base.

8. The apparatus of claim 1, wherein the line device comprises a loop portion and a hook portion.

9. The apparatus of claim 1, wherein the indicator device comprises a spring, a pole, and a flag.

10. The apparatus of claim 1, wherein the base is substantially circular in shape.

* * * * *